United States Patent [19]
Elmore et al.

[11] 3,831,241
[45] Aug. 27, 1974

[54] RADIAL AND THRUST BEARING AND METHOD OF MAKING SAME

[75] Inventors: J. Russell Elmore, New Hartford; Carl F. Benson, Torrington, both of Conn.

[73] Assignee: The Torrington Company, Torrington, Conn.

[22] Filed: Nov. 29, 1973

[21] Appl. No.: 420,055

Related U.S. Application Data

[62] Division of Ser. No. 311,302, Dec. 1, 1972, Pat. No. 3,795,960.

[52] U.S. Cl............................ 29/148.4 R, 29/DIG. 32
[51] Int. Cl........................................... B21k 1/04
[58] Field of Search............... 29/148.4 R, 148.4 A, 29/149.5 R, DIG. 32

[56] References Cited
UNITED STATES PATENTS
2,719,765   10/1955   Menne........................... 29/148.4 A
2,783,528   3/1957    Menne........................... 29/148.4 A Primary Examiner—Thomas H. Eager
Attorney, Agent, or Firm—Frank S. Troidl

[57] ABSTRACT

A bearing is disclosed comprising a rotatable shaft and a coaxial unitary member. The shaft is shaped to provide a ball inner race and at least one roller inner race. The coaxial member has an inside annular protrusion extending toward the shaft. The protrusion has a curved shoulder on one side and a straight shoulder on the other side. The curved shoulder will support a high axial thrust along one direction of the shaft; the straight shoulder will support a relatively low axial thrust applied along the shaft in the opposite direction.

The outer unitary member is made by cold-forming a low carbon-steel tube with a die, carburizing, and then heating the thus-formed outer race in an inert atmosphere, sizing, and which after quenching, provides a hard outer race.

The shaft is made by rolling the ball inner race and at least one roller race into a rod which has been carburized and then heated in an inert atmosphere.

2 Claims, 11 Drawing Figures

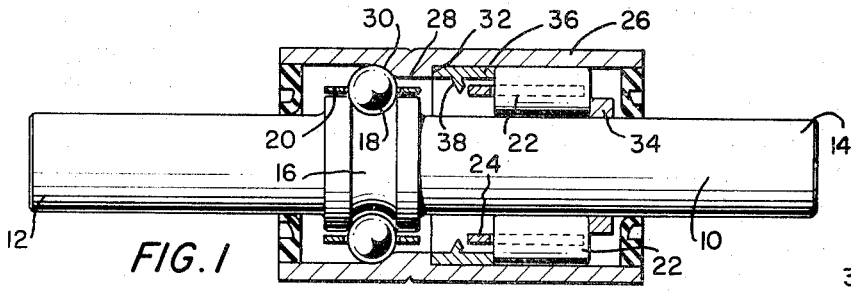
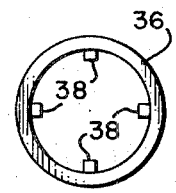
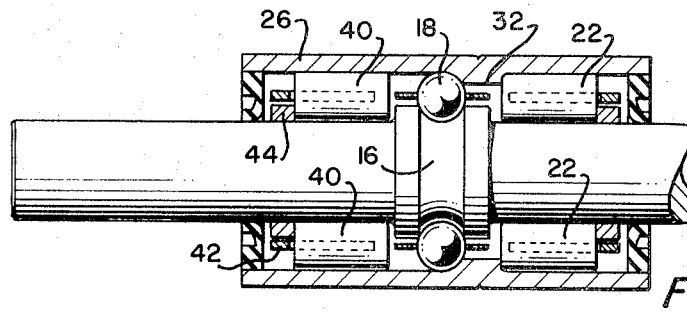
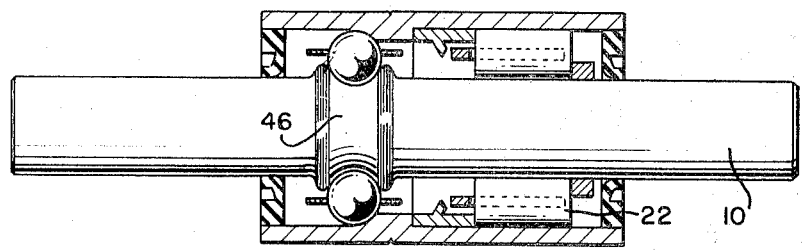
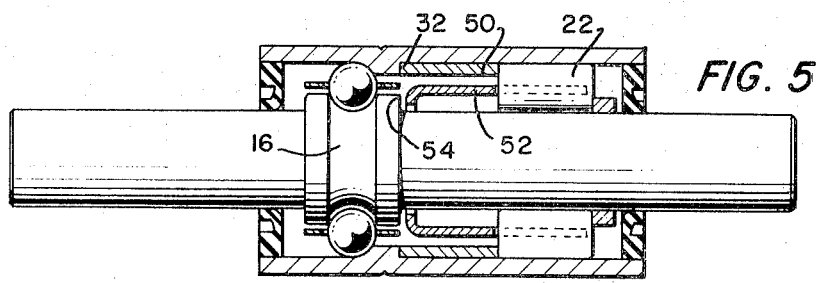

3,831,241

RADIAL AND THRUST BEARING AND METHOD OF MAKING SAME

This is a division of application Ser. No. 311,302, filed Dec. 1, 1972.

This invention relates to radial and thrust bearings. More particularly, this invention is a new and improved radial and thrust bearing, and a new and improved method for making the inner race and the outer race of said bearing.

For certain uses, a bearing must be capable of taking a high radial load, a high thrust load in one direction, and a light thrust load in the opposite direction. One example is an automobile water-pump bearing.

My new radial and thrust bearing is a highly efficient compact radial and thrust bearing consisting of only a few parts. The bearing handles a high radial load, a high axial thrust load in one direction, and a light thrust load in the opposite direction.

Briefly described, the bearing includes a rotatable shaft shaped to provide a ball inner race and at least one roller inner race. The outer bearing comprises a coaxial unitary member. An annular protrusion is provided in the unitary member. The annular protrusion extends toward the shaft and has a curved shoulder on one axial side and a substantially straight shoulder on the other axial side. A ring of balls is adapted to rotate on the inner and outer ball races. A ring of rollers is adapted to rotate on the inner and outer roller race or races. The curved shoulder on the annular protrusion will support the high thrust through the ring of balls; the straight shoulder will support the relatively light thrust through the rollers, and both the balls and the rollers will support the radial and couple loads.

Currently, high carbon-content steel rods and tubes are used to make radial and thrust bearings. High carbon-content steel must be machined and ground to form the races which requires complicated grinding machines. The machining and grinding operations weaken the shaft and/or outer race.

With our new method, both the outer unitary member and the rotatable shaft are made from a low carbon-content steel. Low carbon-content steel can be cold-formed, thus eliminating the grinding steps formerly required. The cold-formed shaft and outer race are carburized, heated, and then quenched to form hard steel members. This results in not only a cheaper bearing, but a bearing consisting of steel parts which are tougher than the steel parts in formerly-made bearings.

The invention, as well as its many advantages, may be further understood by reference to the following detailed description and drawings, in which:

FIG. 1 is an elevational view, partly in section, showing one modification of the invention;

FIG. 2 is a front view of the thrust-ring spacer of FIG. 1;

FIG. 3 is an elevational view, partly in section of another modification of the invention;

FIG. 4 is a side elevational view, partly in section, of a further modification of the invention;

FIG. 5 is an elevational view, partly in section, of a still further modification of the invention;

Like parts in all the figures are referred to by like numbers.

Figure 6:
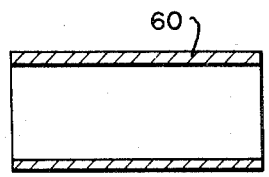
FIG. 6 and FIG. 7 are sectional elevational views, useful in explaining our new method of cold-forming the outer unitary member.

Referring to FIG. 1, the rotatable shaft 10 may be a water-pump shaft. When used in a water pump, the end 12 is connected to the pump impeller, and the end 14 is connected to the fan.

The rotatable shaft 10 includes an integral substantially semicircular annular ball race 16. The adjacent cylindrical surface of the shaft 10 is used as a roller inner race. Balls 18, arranged in the ball cage 20, roll along ball inner race 16; rollers 22, mounted in the roller cage 24, roll around the outside of the shaft 10.

The coaxial unitary outer member 26 includes an integral annular protrusion 28, extending toward the shaft 10. The annular protrusion is shaped to provide a curved shoulder 30 on one axial side and a substantially straight shoulder 32 on the other axial side. The curved shoulder will support the high thrust from the pump impeller and fan through shaft 10 and through the balls 18. A portion of the inside perimeter of the unitary member 26 provides the outer roller race.

A thrust collar 34 is fixedly mounted about the shaft 10 adjacent the axial outer ends of the rollers 22. The thrust collar axially locates the rollers and cage 24 in the outer unitary member 26, and transmits light thrust of the shaft, to the roller ends.

A thrust-ring spacer 36 is mounted within the unitary member 26. The thrust ring spacer has one edge in contact with the straight shoulder 32 on protrusion 28, and the other edge in contact with the axial inner edges of the rollers 22. Thus, any small thrusts, such as caused by vibrations in the fan connected to shaft 10, is transmitted through this shaft collar, the rollers, the thrust-ring spacer, and against the straight shoulder. Movement of the cage axially is prevented by the protrusions 38 extending inwardly from the thrust-ring spacer, as shown in FIG. 1 and FIG. 2.

In the embodiment of FIG. 3, the rollers 22 bear directly against the shoulder 32, making a thrust-ring spacer unnecessary. Also, a second set of rollers 40 is located on the other side of the ball race 16 from the location of the first set of rollers 22. Rollers 40 and cage 42 are prevented from falling out of member 26 by a fixedly-mounted thrust collar 44.

In the embodiments of FIGS. 1, 3, and 5, the minor diameter of the ball race 16 on the shaft is approximately the same as the shaft diameter. However, in the embodiment of FIG. 4, a ball inner race 46 is provided in the shaft 10 with a minor diameter less than the shaft diameter. The shafts of the embodiments of FIGS. 1, 3, and 5 are much stronger and more fatigue-resistant than the shaft shown in the embodiment of FIG. 4. However, the embodiment of FIG. 4 is satisfactory for certain operations which do not require an extremely strong shaft.

In the embodiment of FIG. 5, the thrust-ring spacer 50 has no projections. The ring spacer has one edge bearing against shoulder 32, and the other edge bearing against rollers 22. The projections are unnecessary because the roller cage 52 is located against axial movement by the shoulder 54 on the outer edge of the ball inner race 16.

In practicing my new method for making an outer race for a radial and thrust bearing, the tubular sleeve 60, shown in FIG. 6, may be made of a low carbon-content steel and may be formed from an extruded tube, welded tubing, or flat strip stock.

Figure 7:
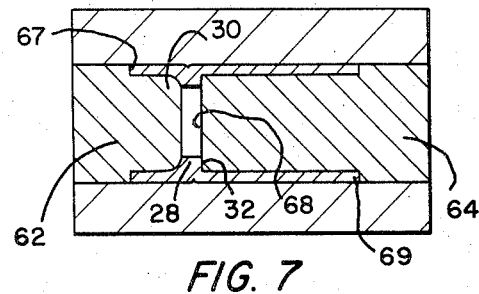

An important step in the method is the formation of the annular protrusion 28 by a cold-forming method. As shown in FIG. 7, the protrusion 28 is formed in a die, including punches 62 and 64. Punch 62 includes a curved end 66, and annular shoulder 67, which press against the tube 60 to form the curved shoulder 30. Punch 64 has a flat cylindrical end 68 and annular shoulder 69, which press against the tube 60 to form the substantially straight shoulder 32 and the roller outer race. Thus, the punches are shaped to provide the ball outer race and the roller outer raceway in the interior of the unitary member.

The cold-formed unitary outer race is then removed from the die, carburized, and then heated into the austenitic range in a furnace, or by induction heating, to a temperature of at least 1400° F. The heating is done in an inert atmosphere such as nitrogen, or in a carburizing atmosphere. The outer race 60 is then quenched and sized. This can be done: (1) by pushing a properly-formed plug into each end of the race and pushing the entire assembly into quenching oil, or (2) dropping the race between rollers to roll the outside diameter to proper size and straightness, and then flooding it with quenching oil to harden. The sizing operation is carried out in an inert atmosphere, such as nitrogen.

Figure 8:
FIGS. 8 and 9 are elevational views useful in explaining our new method of forming the ball race and roller races on the rotatable shaft.
Figure 9:
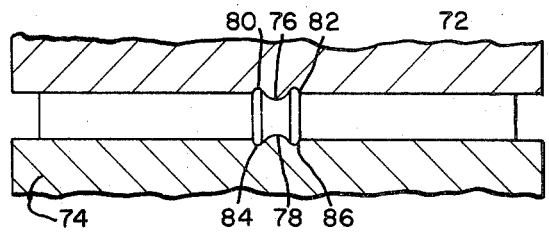

As shown in FIG. 8, a low-carbon-content steel rod 70 may be used to make either a shaft having a ball race with a minor diameter less than the shaft diameter, or with a minor diameter equal to the shaft diameter. The low-carbon-content rod is carburized and then heated in an inert gas or carburizing atmosphere to the austenitic range of 1400° F or above in a furnace or by induction heating. The heated rod is then placed in a rolling machine which includes the rollers 72 and 74 of FIG. 9. The rollers include annular grooves 80 and 82 adjacent protrusion 76, and annular grooves 84 and 86 adjacent protrusion 78. The rollers roll the ball race 46 of the modification shown in FIG. 4 in an inert atmosphere. This ball race has a minor diameter less than the shaft diameter. The rollers also roll the roller inner races and straighten the shaft at the same time. The thus-formed inner race is then flooded with quenching oil to harden.

Figure 10:
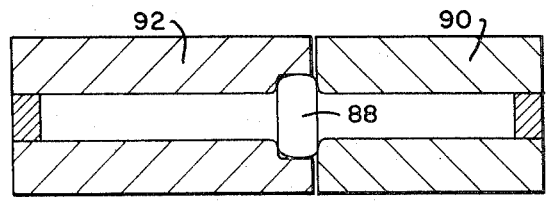
FIG. 10 and FIG. 11 illustrate an alternative method of forming the ball race and roller races on the shaft.
Figure 11:
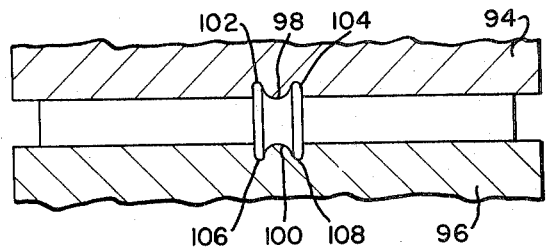

In order to form the inner race of FIGS. 1, 3 and 5, the shaft 70, of low carbon content, is bulged at the desired axial position by a cold-forming die before it is carburized. As shown in FIG. 10, the shaft is bulged at 88 by two dies 90 and 92. The bulged shaft is carburized, heated into the austenitic range in an inert or carburizing atmosphere, and then placed into the rollers 94 and 96 of FIG. 11. The rollers 94 and 96 are provided with annular protrusions 98 and 100, respectively, and annular grooves 102 and 104 on the roller 94, and annular grooves 106 and 108 on roller 96. The inner ball race 16 is formed on the shaft 10, as well as the adjacent inner roller race or races in an inert atmosphere. The shaft is simultaneously straightened by the roller-race rollers. The rolled shaft is then quenched with quenching oil to harden the shaft.

We claim:

1. In a method of forming an inner race for a bearing: carburizing a low carbon content steel rod; heating the carburized rod to a temperature above 1400° F in an inert atmosphere placing the heated rod between rollers shaped to roll a curved ball race into the rod, and rolling at least one roller race while straightening the rod; and quenching the thus formed rod to harden.

2. The method of forming an inner race in accordance with claim 1 wherein: a center section of the rod is bulged by a cold-forming die before it is carburized, and the rollers are shaped to roll the curved ball race into the bulged center section.

* * * * *